United States Patent [19]

Fujii et al.

[11] Patent Number: 5,326,590

[45] Date of Patent: Jul. 5, 1994

[54] METHOD OF REJUVENATING RUBBER PRINTING BLANKETS

[75] Inventors: Gary Fujii, Torrance; Lowell W. Huff, Fullerton, both of Calif.

[73] Assignee: Clayton Chemical Company, Los Angeles, Calif.

[21] Appl. No.: 938,276

[22] Filed: Aug. 31, 1992

[51] Int. Cl.$^5$ ............................................. B05D 5/00
[52] U.S. Cl. .................................. 427/140; 427/393.5; 427/397.7; 427/256
[58] Field of Search .................. 427/140, 393.5, 297.7, 427/256

[56] References Cited

U.S. PATENT DOCUMENTS

| | | | |
|---|---|---|---|
| 1,114,841 | 10/1914 | Wright | 427/140 |
| 3,257,945 | 6/1966 | Smith | 427/140 |
| 3,591,410 | 7/1971 | Ross | 427/140 |
| 4,396,703 | 8/1983 | Matsumoto et al. | 427/140 |
| 4,946,710 | 8/1990 | Miller et al. | 427/126.3 |
| 4,963,390 | 10/1990 | Lipeles et al. | 427/110 |

OTHER PUBLICATIONS

S. D. Ramamurthi, et al., "Structural Investigations of Prehydrolyzed Precursors Used in the Sol-Gel Processing of Lead Titanate", J. Am. Ceram. Soc, 73 (8) pp. 2547–2551, (1990). (no mo.).

T. W. Dekleva, et al., "Sol-Gel Processing of Lead Titanate in 2-Methoxyethanol: Investigations into the Nature of the Prehydrolyzed Solutions", Comm. of Amer. Soc., J. Am. Ceram, Soc., 71(5), pp. C-280–C282 (1988). (no mo.).

Primary Examiner—Janyce Bell
Attorney, Agent, or Firm—Spensley Horn Jubas & Lubitz

[57] ABSTRACT

A method of rejuvenating and repairing a rubber printing blanket comprising the steps of contacting a rubber sweller solvent such as N-methyl-2-pyrrodidone with a thickening agent such as carboxypolymethylene to form a gelable mixture, and applying the resulting mixture to the rubber printing blanket.

32 Claims, 1 Drawing Sheet 5,326,590

METHOD OF REJUVENATING RUBBER PRINTING BLANKETS

FIELD OF THE INVENTION

This invention relates generally to rubber compositions, and more particularly to a method of rejuvenating and repairing rubber printing blankets.

BACKGROUND OF THE INVENTION

Printing is the art and technology of reproducing words and pictures on paper, cloth, or other surfaces. Although there is a considerable variation in printing methods, printing typically involves a printing press that transfers an image from a printing plate or similar image-bearing surface to the material being printed.

Generally, printing presses are used for high-speed, high volume reproduction, especially to print books, newspapers, magazines, leaflets, wallpaper, posters and a number of other items.

In the 15th Century, the first printing press was invented by Johann Gutenberg, a German printer. Even though the art of printing has been known, at least in the Far East, for centuries, Gutenberg revolutionized and put together all the work of his predecessors to develop new techniques and invent the method that laid the foundation for all future printing.

Since then, a number of new and improved printing presses have been developed. For example in the early to mid-1800's the cylinder press (1810), the power press (1822) and the rotary press (1846) were invented. These types of presses are otherwise referred to as letterpress machines.

In addition to these letterpress machines, other printing methods such as gravure, offset lithography and screen-process were introduced. Lithography, for example, which is the process of printing from a plane surface on which the image to be printed is ink-receptive and the blanket area ink-repellant, was invented by Alois Senefelder of Prague in the late 1700's. The offset principle of transferring the image to paper by use of rubber blanket cylinders was invented by Ira Rubel, an American printer, about 1905.

In modern times major innovations in the printing industry have been developed which have revolutionized printing as we know it today. These innovations include the development of photo-typesetters, computers for automatic justification and hyphenation, electronic scanning machines for use in color printing, and electrostatic screen printing.

Nevertheless, in machine printing, offset lithography is still one of the most common processes used today, mainly because of its platemaking economics.

Generally, a printing machine carries out three processes: (1) it applies ink to a printing surface; (2) it applies pressure to transfer the ink to paper or some other material; and (3) it moves and holds the material so that every printed image is positioned accurately.

For example, an offset printing press (10'), as shown in FIG. 1, is comprised of a thin metal plate which is carried on a plate cylinder (12'). Associated with the plate cylinder (12') are two sets of rollers. As the plate cylinder (12') turns and before it is linked, the plate cylinder (12') is first wet by the first set of rollers (14') called the dampening system. At this stage of the printing process the non-image areas will repel the ink. The second set of rollers (16'), called the inking system, then applies the ink to the image areas. A blanket cylinder (18') then picks up the image of the plate and prints it on one side of a piece of paper (20') passing through the blanket cylinder (18') and an impression cylinder (22'). The blanket cylinder (18') is also referred to as a rubber printing blanket since it is typically made of canvas covered with one or more layers of the rubber.

Over time, the rubber printing blanket, due to constant and excessive use, inevitably deteriorates and becomes damaged. For example, the rubber printing blanket may become dented on its outer surface or lose its resiliency, thus adversely affecting the quality of the print. Whether the blanket becomes dented or damaged sometimes depends on the type of material onto which the image is transferred. Cardboard or heavy stock paper has been known to cause dents in the blanket more frequently than thinner papers.

A number of chemical products are currently available and widely used in the printing industry for repairing these rubber printing blankets. These products often contain chemicals such as methylene chloride, perchloroethane, 1,1,1-trichloroethane and other chlorinated solvents. The majority of these rubber swelling/blanket washing products contain methylene chloride.

These products, also known as blanket washes, are usually brushed on the blanket causing the rubber blanket to swell to its original shape. Many of these washes also serve to remove the ink from the blanket. They quickly evaporate after being applied, thus leaving the blanket dry.

Many problems, however, are associated with the use of these blanket washes. For example, when applied to the blanket, residual amounts of these washes sometimes remain in the blanket, thus preventing the inked image from being properly transferred to the blanket. Also, since the washes are usually brushed on the blankets, brush marks usually are formed on the blankets.

Moreover, these chemicals, i.e., methylene chloride, perchloroethane and 1,1,1-trichloroethane, which are used to make these blanket washes, are highly flammable, highly toxic and require special handling. Their toxicity may create hazardous health problems in the work place, and also when disposed of, they can pollute the ground water. Further, these chemicals are known to cause ozone depletion in the earth's atmosphere.

In light of the Clean Air and Water Act, use of products containing these hazardous chemicals is being discouraged by lawmakers and environmentalists. Also, many businesses currently using these chemical products are looking for alternative chemical products which are environmentally safer and do not damage the ozone layer.

As discussed below, the embodiments of the present invention overcome and avoid the above problems associated with using these chemicals to swell rubber printing blankets.

N-methyl-2-pyrrolidone, shown below, otherwise known as M-PYROL ® or NMP ® (a registered trademark of GAF Chemicals Corporation of Wayne, N.J.) is a solvent which is used, for example, in nonflammable foams, rubber and vinyl adhesives, and as a stripper for epoxy resins and as a solvent for curing agents.

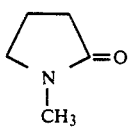

Mixtures of N-methyl-2-pyrrolidone and carboxypolymethylene are used in certain applications, namely stripping formulations, rubber and vinyl cements, and metal degreasing, where a gel-like consistency is desirable.

For example, N-methyl-2-pyrrolidone can be mixed with carboxypolymethylene to create an easy to handle, nonflowing epoxy paint stripper. To create this paint stripper, carboxypolymethylene is added very slowly to N-methyl-2-pyrrolidone. The mixture is agitated vigorously while heating below the flash point of the solvent (95° C., 204° F.). The mixture is then neutralized with di-2-ethylhexylamine.

SUMMARY OF THE INVENTION

To overcome the aforementioned problems, the present invention in its broadest sense, provides a method for rejuvenating and repairing a rubber printing blanket which has been dented or has lost its resiliency. The method comprises the steps of forming a mixture of a rubber sweller solvent and a thickening agent. The resulting mixture is then applied to the rubber printing blanket, thus allowing the blanket to swell and rejuvenate.

Other objects or features of the present invention will become better understood by reference to the following detailed descriptions.

DETAILED DESCRIPTION OF THE INVENTION

Figure 1:
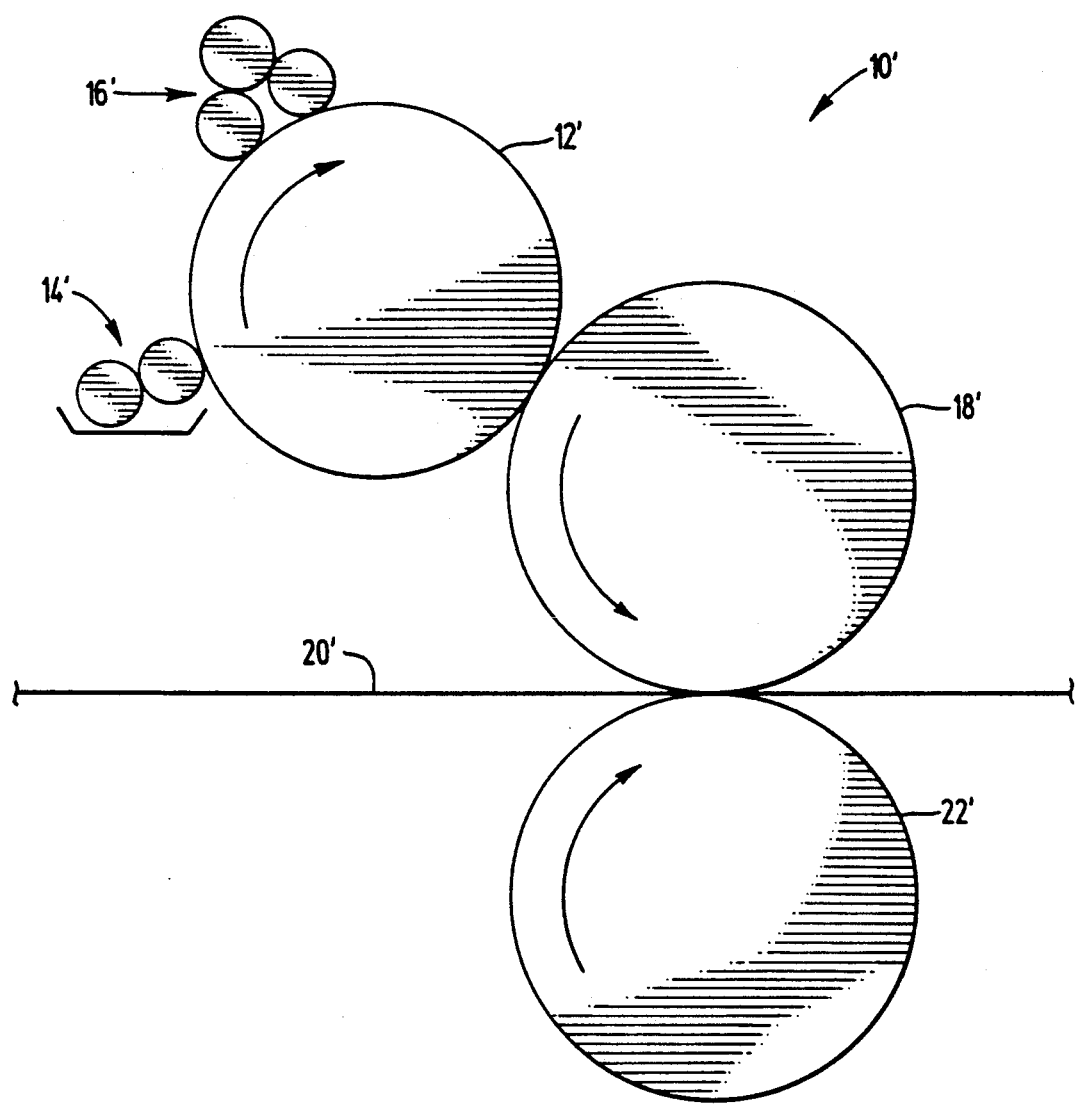
FIG. 1 is a side schematical view of a prior art offset printing press.

The present invention is directed to a method of rejuvenating and repairing a rubber printing blanket which has been damaged (i.e., dented) or has lost its resiliency, or both. This method comprises the steps of mixing a rubber sweller solvent with a relatively small quantity of a thickening agent. As soon as the mixture achieves a gelable consistency it is applied to damaged or dented areas of the outer surface of the rubber printing blanket with a brush, for example, without leaving brush marks on the resulting printed material.

The rubber sweller solvents of the present invention are selected from the group consisting of glycol ethers, pyrrolidones and derivatives and mixtures thereof.

The glycol ether solvents are preferably selected from the group consisting of diethylene glycol phenyl ether, triethylene glycol methyl ether, propylene glycol methyl ether, dipropylene glycol methyl ether, tripropylene glycol methyl ether and mixtures thereof.

In the present invention, the preferable rubber sweller solvent used is N-methyl-2-pyrrolidone. N-methyl-2-pyrrolidone is outstandingly stable, both thermally and chemically. It is also completely miscible with water and exhibits a low order of oral toxicity ($LD_{50}$=7 g/kg, rats) and mild topical effects (neither a primary skin irritant nor sensitizer).

N-methyl-2-pyrrolidone dissolves many inorganic and organic compounds, including a number of plastics which are difficult to dissolve, as well as hydrocarbons, sulfur and metal salts.

N-methyl-2-pyrrolidone also does not contain or emit hydroflurocarbons and hydrocarbons into the atmosphere which may cause ozone depletion in the atmosphere.

The thickening agents of the present invention are well known thickeners. They are selected from the group consisting of carboxymethylcellulose, hydroxymethylcellulose, hydroxyethylcellulose (Cellosize ® QP-40, manufactured by Union Carbide of New York, N.Y.), hydroxypropyl methylcellulose (Methocel HG, manufactured by Dow Chemical U.S.A. of Midland, Mich.), colloidal silica particles sintered together in chain-like formations (Cab-o-Sil ®, a trademark of Cabot Corp. of Tuscola, Ill.), carboxypolymethylene (Carbopol ®, a trademark of The B.F. Goodrich Company of Calvert, City, Ky. for a group of water-soluble vinyl polymers having excellent thickening and gel-forming properties) and mixtures thereof.

In the present invention the preferable thickening agent is carboxypolymethylene.

The mixture of the present invention is prepared by adding an amount of the thickening agent to the solvent at a rate and temperature sufficient to allow the mixture to retain a gelable consistency. Preferably, the thickening agent should slowly be added to the solvent at room temperature (20°-25° C.).

As the thickening agent is being added to the solvent, the mixture should be agitated sufficiently to enable the mixture to retain a gelable consistency. For example, blenders with propellers turning at 400 rpm may be used to gently mix the thickening agent with the solvent. Preferably, the mixture should be agitated gently and not vigorously.

The viscosities or gelable consistencies of different mixtures of the present invention made with different percentages of thickening agents in N-methyl-2-pyrrolidone (NMP ®) were indirectly measured by observing their ability to "run" on a vertical rubber mat similar to those used in print shops.

The following four mixtures were prepared and their viscosities subsequently tested:

1. 2.5% Carbopol ® 672 by weight of NMP ®. This mixture was prepared by weighing 3.0 grams of Carbopol ® 672 which were slowly added to approximately 90-95 mls of NMP ®. After 2.5 grams of Carbopol ® 672 were added, the solution became very viscous with a "lumpy" texture. The mixture was also slightly cloudy. The amount of NMP ® was brought up to 100 mls and the remaining Carbopol ® 672 was added to the solution. It was found that 2.54 grams of the Carbopol ® 672 were dissolved and forms a gel up to 2.9% by weight of the solution. It is preferable that this mixture contains Carbopol ® 672 in an amount ranging from about 0.75% to about 2.00% by weight NMP ®. 2. 2.9% Carbopol ® 934 by weight of NMP ®. This mixture was prepared by weighing 3.0 grams of Carbopol ® 934 which were slowly added to 95 mls of NMP ®. The solution became very viscous with a slightly lumpy texture. The mixture was slightly cloudy. At a final volume of 100 mls of NMP ®, it was found that 2.86 grams of Carbopol ® 934 were dissolved. It is preferable that this mixture contains Carbopol ® 934 in an amount ranging from about 0.75% to about 2.00% by weight NMP ®.

3. 6.0% hydroxyethylcellulose QP-40 by weight of NMP ®. 20.00 grams of Cellosize ® hydroxyethylcellulose QP-40 was added to 90-95 mls of NMP ®. About a third of the mixture was a transparent brown gel. Not all of the hydroxyethylcellulose dissolved. The final volume of NMP ® was brought up to 200 mls wherein 12.12 grams of the original solution were used in order to form a 6.0% solution. It is preferred that this mixture contains hydroxyethylcellulose in an amount ranging from 2.00% to about 6.00% by weight NMP ®.

4. 15% Cab-O-Sil ® EH5 by weight of NMP ®. 15.00 grams of Cab-O-Sil ® were dissolved in 100 mls of NMP ®. The mixture became very viscous, but was not lumpy. The mixture also was clear (transparent and colorless). It is preferred that this mixture contains Cab-O-Sil ® in an amount ranging from about 5.00% to about 15.00% by weight NMP ®.

The amount of thickening agent to be added to the solvent could be as low as approximately 0.75% by weight of the solvent and as high as approximately 15.0% by weight of the solvent. The amount of thickening agent to be added to the solvent can be lower or higher than 0.75% or 15.0% by weight of the solvent, respectively, depending upon the desired consistency of the resulting mixture and the degree of purity of the solvent and/or thickening agent used.

Preferably, the amount of thickening agent used in the present invention should be approximately 1.0% to 5.0% by weight of the solvent.

The following example in conjunction with the above general and detailed description more fully illustrates the nature and character of the mixture of the present invention. This example is illustrative only and is not intended to limit the scope of the invention.

EXAMPLE 1

Ten pounds of carboxypolymethylene was slowly added to twenty gallons of N-methyl-2-pyrrolidone. As the carboxypolymethylene was being added to the N-methyl-2-pyrrolidone, the mixture was being gently agitated. The rate at which the carboxypolymethylene was being added and the amount of agitation applied to the mixture was monitored to assure that the mixture would retain a gelable consistency.

After the resulting mixture has been prepared, it is applied to the damaged or dented portions of rubber printing blanket. The mixture is left on the blanket for a period of time sufficient to restore and rejuvenate the damaged or dented portions of the blanket. Preferably, the mixture should remain on the blanket for about 10 to about 30 seconds depending on the degree of damage incurred by the blanket. If the mixture is allowed to remain on the blanket for more than about 30 seconds, the treated portions of the blanket may swell to a size greater than their size before having been damaged.

The resulting mixture can be applied to the blanket in any practical manner. For example, the mixture may be dispersed out of a squeeze bottle onto the blanket and spread along the surface of the blanket using a towel, brush, or finger.

After the rubber blanket has been sufficiently restored, the mixture is then removed from the blanket. A squeegee, for example, may be used to remove the mixture.

After completing the steps of this process the user will notice that the treated portions of the rubber printing blanket will swell and become rejuvenated. For example, dents in the blanket will decrease in volume by about 50%. Preferably, dents in the blanket will decrease in volume by about 75%, and more preferably, dents in the blanket will decrease in volume by about 95%.

Moreover, the treated portions of the rubber blanket will restored to possess a size, shape, resiliency and appearance substantially similar to the size, shape, resiliency and appearance of the rubber blanket prior to having been damaged. Thus, the quality of the rubber printing blanket will be restored to its proper working condition.

In addition, the mixture of the present invention may also be used to help remove excess ink from the rubber printing blanket. When the mixture is applied to a rubber printing blanket having excess ink on it, the mixture flows underneath the ink, lifts the ink up off the blanket and prevents the ink from setting back down. After the ink has been lifted up off the blanket, the ink may be easily wiped off with a rag, paper towel or squeegee, for example.

One advantage of the method of the present invention is that it will not contribute to the depletion of the ozone layer in light of the fact that the rubber sweller solvents used do not contain or emit hydrofluorocarbons or hydrocarbons into the earth's atmosphere.

In addition, the mixture of the present invention also does not leave any residual blanket saver on the rubber blanket since it can be easily removed with a squeegee or a wet wiper (i.e., a rag), for example. Further, if one uses a brush to apply the mixture of the present invention onto the blanket, no brush marks will be left in the blanket due to the consistency of the gelable mixture.

Another advantage of the present invention is that the resulting mixture has a low toxicity, it is not flammable, does not require any special handling, and has a low composite vapor pressure (does not quickly evaporate).

In sum, the present invention achieves these primary objectives: efficiency, economy and safety in rejuvenating damaged rubber printing blankets and helping to remove excess ink from the blankets without significantly harming the environment. The method involves the steps of mixing a rubber sweller solvent with a thickening agent to form a resulting mixture. This mixture is then applied to the rubber printing blanket in an amount sufficient to rejuvenate the damaged blanket's surface and restore its resiliency.

While this invention has been particularly shown and described in reference to the preferred embodiments, it will be understood by those skilled in the art that changes in form and detail may be made without departing from the spirit or scope of the invention. Accordingly, the present invention is not limited to the specific arrangements described in the foregoing detailed description.

What is claimed is:

1. A method of rejuvenating and repairing a rubber printing blanket, the method comprising the steps of:
    mixing a rubber sweller solvent selected from the group consisting of glycol ethers, pyrrolidones and mixtures thereof with a thickening agent to thereby form a mixture; and
    applying the resulting mixture to the rubber printing blanket.

2. The method according to claim 1 wherein the resulting mixture is applied to the rubber printing blanket by a brush without leaving brush marks on the resulting printed material.

3. The method according to claim 1 wherein the solvent is selected from the group consisting of diethylene glycol phenyl ether, triethylene glycol methyl ether, propylene glycol methyl ether, dipropylene glycol methyl ether, tripropylene glycol methyl ether, terpinyl ethylene glycol ether, N-methyl-2-pyrrolidone and mixtures thereof.

4. The method according to claim 1 wherein the solvent is N-methyl-2-pyrrolidone.

5. The method according to claim 4 wherein the mixture is formed by adding the thickening agent to the N-methyl-2-pyrrolidone, and agitating the mixture for a period of time and at a temperature sufficient to provide a resulting mixture having a gelable consistency.

6. The method according to claim 5 wherein the thickening agent is selected from the group consisting of carboxymethylcellulose, hydroxymethylcellulose, hydroxyethylcellulose, hydroxypropyl methylcellulose, carboxypolymethylene, colloidal silica particles sintered together in a chain-like formation and mixtures thereof.

7. The method according to claim 5 wherein the thickening agent is carboxypolymethylene.

8. The method according to claim 7 wherein an amount of carboxypolymethylene is added to and mixed with an amount of N-methyl-2-pyrrolidone sufficient to rejuvenate and repair the rubber printing blanket.

9. The method according to claim 4 wherein the amount of the thickening agent is at least 0.75% by weight of the N-methyl-2-pyrrolidone.

10. The method according to claim 4 wherein the amount of the thickening agent ranges from 0.75% to 15.0% by weight of the N-methyl-2-pyrrolidone.

11. The method according to claim 4 wherein the amount of the thickening agent is 1.0% to 5.0% by weight of the N-methyl-2-pyrrolidone.

12. The method according to claim 4 wherein the resulting mixture is spread onto the damaged portions of the outer surface of the rubber printing blanket.

13. The method according to claim 4 wherein the resulting mixture remains on the rubber blanket for a period of time sufficient to restore the rubber blanket to its a size, shape, resiliency and appearance substantially similar to the size, shape, resiliency and appearance of the rubber blanket prior to having been damaged.

14. The method according to claim 13 wherein the dents in the blanket decrease in volume by at least 50%.

15. The method according to claim 12 wherein dents in the blanket decrease in volume by 75% to 95%.

16. The method according to claim 4 wherein the resulting mixture remains on the rubber blanket for about 10 to about 30 seconds.

17. A method of rejuvenating and repairing a damaged rubber printing blanket, the method comprising the steps of:
  contacting N-methyl-2-pyrrolidone with carboxypolymethylene, wherein the carboxypolymethylene is present in an amount of 1.0% to 5.0% by weight of N-methyl-2-pyrrolidone;
  mixing the carboxypolymethylene with the N-methyl-2-pyrrolidone for a period of time and at a temperature sufficient to provide a resulting mixture having a gelable consistency;
  applying the mixture to the rubber printing blanket, and allowing the mixture to remain on the blanket for a period of time sufficient to restore the rubber blanket to a size, shape, resiliency and appearance substantially similar to the size, shape, resiliency and appearance of the rubber blanket prior to having been damaged.

18. A method of rejuvenating and repairing a damaged rubber printing blanket, the method comprising the steps of:
  mixing a thickening agent with a rubber sweller solvent selected from the group consisting of glycol ethers, pyrrolidones and mixtures thereof;
  the amount of the thickening agent being at least 0.75% by weight of the solvent; and
  applying the resulting mixture to the rubber printing blank, and allowing the mixture to remain on the blanket for a period of time sufficient to restore the rubber blanket to a size, shape, resiliency and appearance substantially similar to the size, shape, resiliency and appearance of the rubber blanket prior to having been damaged.

19. The method according to claim 18 wherein said solvent is selected from the group consisting of diethylene glycol phenyl ether, triethylene glycol phenyl ether, propylene glycol methyl ether, dipropylene glycol methyl ether, tripropylene glycol methyl ether, terpinyl ethylene glycol ether, N-methyl-2-pyrrolidone and mixtures thereof.

20. The method according to claim 18 wherein said thickening agent is selected from the group consisting of carboxymethylcellulose, hydroxymethylcellulose, hydroxyethylcellulose, hydroxypropyl methylcellulose, carboxypolymethylene, colloidal silica particles sintered together in chain-like formations and mixtures thereof.

21. The method according to claim 18 wherein the solvent is N-methyl-2-pyrrolidone.

22. The method according to claim 18 wherein the thickening agent is added to the solvent at a rate sufficient to produce a mixture having a gelable consistency.

23. The method according to claim 18 wherein the amount of the thickening agent ranges from 1.0% to 5.0% by weight of the solvent.

24. The method according to claim 18 wherein the amount of thickening agent ranges from 0.75% to 15.0% by weight of the solvent.

25. The method according to claim 18 wherein the thickening agent and the solvent are mixed for a period of time sufficient to form a resulting mixture having a gelable consistency.

26. The method according to claim 18 wherein the thickening agent is mixed with the solvent at a temperature ranging from 20° to 25° C.

27. A method of rejuvenating and repairing a rubber printing blanket, the method comprising the steps of:
  preparing a mixture consisting essentially of a rubber sweller solvent selected from the group consisting of glycol ethers, pyrrolidones and mixtures thereof and a thickening agent; and
  applying said mixture to said rubber printing blanket.

28. The method according to claim 27 wherein said thickening agent is selected from the group consisting of carboxymethylcellulose, hydroxymethylcellulose, hydroxyethylcellulose, hydroxypropyl methylcellulose, carboxypolymethylene, colloidal silica particles sintered together in a chain-like formation and mixtures thereof.

29. The method according to claim 27 wherein said remains on said rubber blanket for a period of time sufficient to restore said rubber blanket to its a size, shape, resiliency and appearance substantially similar to the size, shape, resiliency and appearance of said rubber blanket prior to having been damaged.

30. A method of rejuvenating and repairing a rubber printing blanket, the method comprising the steps of:
preparing a mixture of a rubber sweller solvent selected from the group consisting of glycol ethers, pyrrolidones and mixtures thereof and a thickening agent which is free of abradants; and
applying said mixture to said rubber printing blanket.

31. The method according to claim 30 wherein said thickening agent is selected from the group consisting of carboxymethylcellulose, hydroxymethylcellulose, hydroxyethylcellulose, hydroxypropyl methylcellulose, carboxypolymethylene, colloidal silica particles sintered together in a chain-like formation and mixtures thereof.

32. The method according to claim 30 wherein said mixture remains on said rubber blanket for a period of time sufficient to restore said rubber blanket to its a size, shape, resiliency and appearance substantially similar to the size, shape, resiliency and appearance of said rubber blanket prior to having been damaged.

* * * * *